Dec. 6, 1960 T. A. HERBERT, JR 2,962,811
METHOD OF MAKING STAINLESS STEEL HONEYCOMB PANELS
Filed Sept. 19, 1955 3 Sheets-Sheet 1
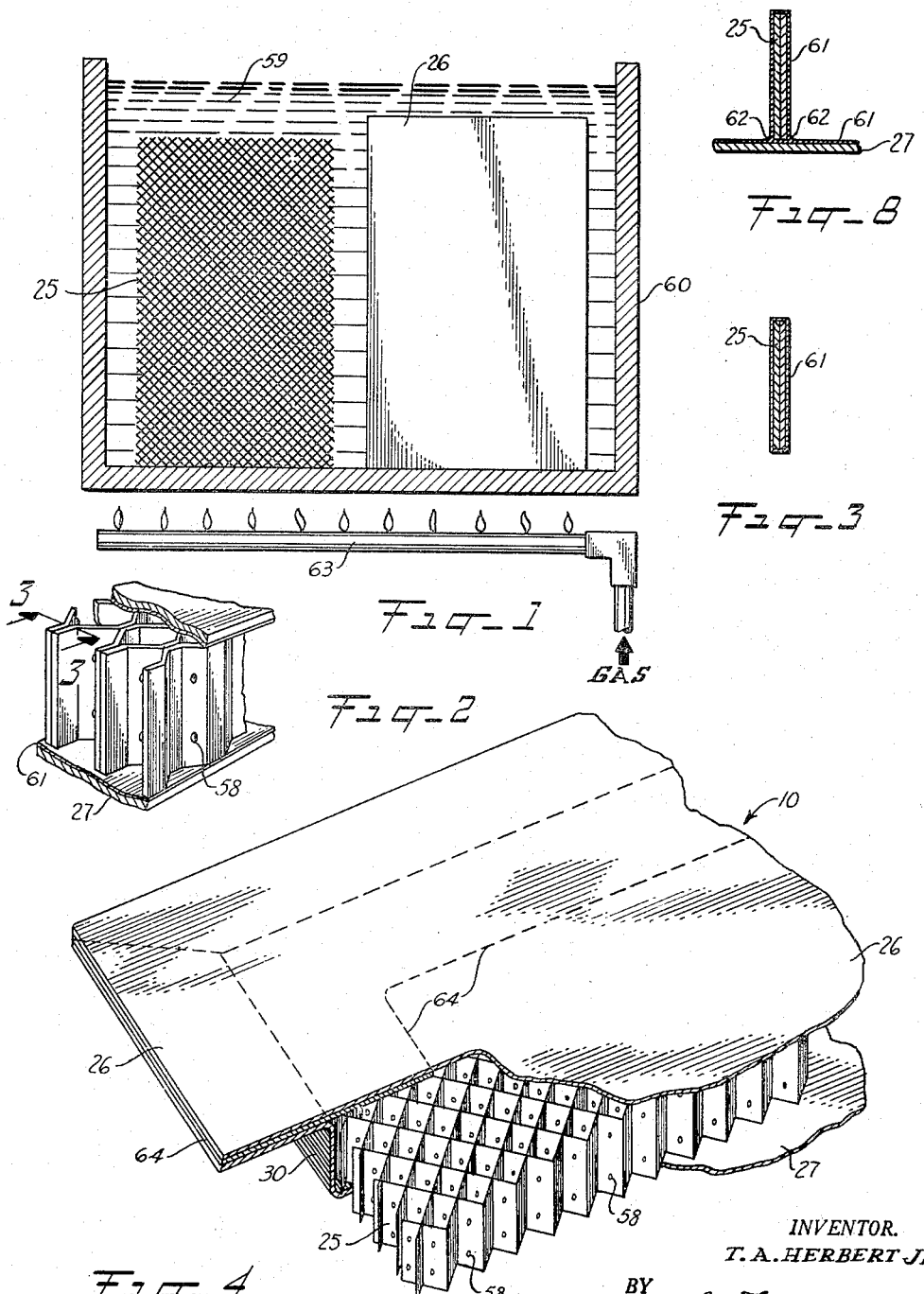
INVENTOR.
T. A. HERBERT JR.
BY
ATTORNEY Dec. 6, 1960 T. A. HERBERT, JR 2,962,811
METHOD OF MAKING STAINLESS STEEL HONEYCOMB PANELS
Filed Sept. 19, 1955 3 Sheets-Sheet 2

INVENTOR.
T.A. HERBERT JR.
BY
S. Tierney, Jr.
ATTORNEY

Dec. 6, 1960     T. A. HERBERT, JR     2,962,811
METHOD OF MAKING STAINLESS STEEL HONEYCOMB PANELS
Filed Sept. 19, 1955     3 Sheets-Sheet 3

INVENTOR.
T.A. HERBERT JR.
BY S. Tierney, Jr
ATTORNEY

United States Patent Office 2,962,811
Patented Dec. 6, 1960

2,962,811

METHOD OF MAKING STAINLESS STEEL HONEYCOMB PANELS

Thomas A. Herbert, Jr., Chula Vista, Calif., assignor to Rohr Aircraft Corporation, Chula Vista, Calif., a corporation of California Filed Sept. 19, 1955, Ser. No. 535,102

2 Claims. (Cl. 29—455)

This invention relates to a metal honeycomb sandwich and method of making same and is particularly concerned with a novel method of securing a strong brazed joint between the cellular core and the metal plates attached thereto.

It is an object of the invention to provide a thin film of brazing metal which is firmly attached to the metal sheet before the sheet is laid on the core and heated to effect the braze.

Another object is to provide a thin film of metal on the cellular core which is firmly attached thereto and which serves to braze a metal sheet to the core when the parts are pressed together and heated to a temperature sufficient to effect a braze.

A further object is to provide a thin film of chemically deposited nickel alloy which serves to securely unite the parts of the assembled sandwich when the temperature is raised to a sufficient degree.

Another object is to provide a film of the above type which is sufficiently thick to form strong reinforcing fillets at the regions where the metal sheets of the panel abut the cellular core.

Further objects will become apparent as a description of the brazing method proceeds. For a better understanding of the invention reference is made to the accompanying drawings in which:

Fig. 1 is a diagrammatic view partly in section showing means for chemically plating a honeycomb core and metal sheet of a sandwich panel;

Fig. 2 is a perspective view, partly in section, of a portion of a honeycomb panel;

Fig. 3 is a section taken on line 3—3 of Fig. 2 showing the plating of brazing metal on the abutting portions of two honeycomb cells;

Fig. 4 is a fragmentary perspective view partly in section of a portion of a sandwich panel;

Fig. 8 is a section similar to Fig. 3 showing also a portion of the bottom skin of the sandwich panel.

Figure 5:
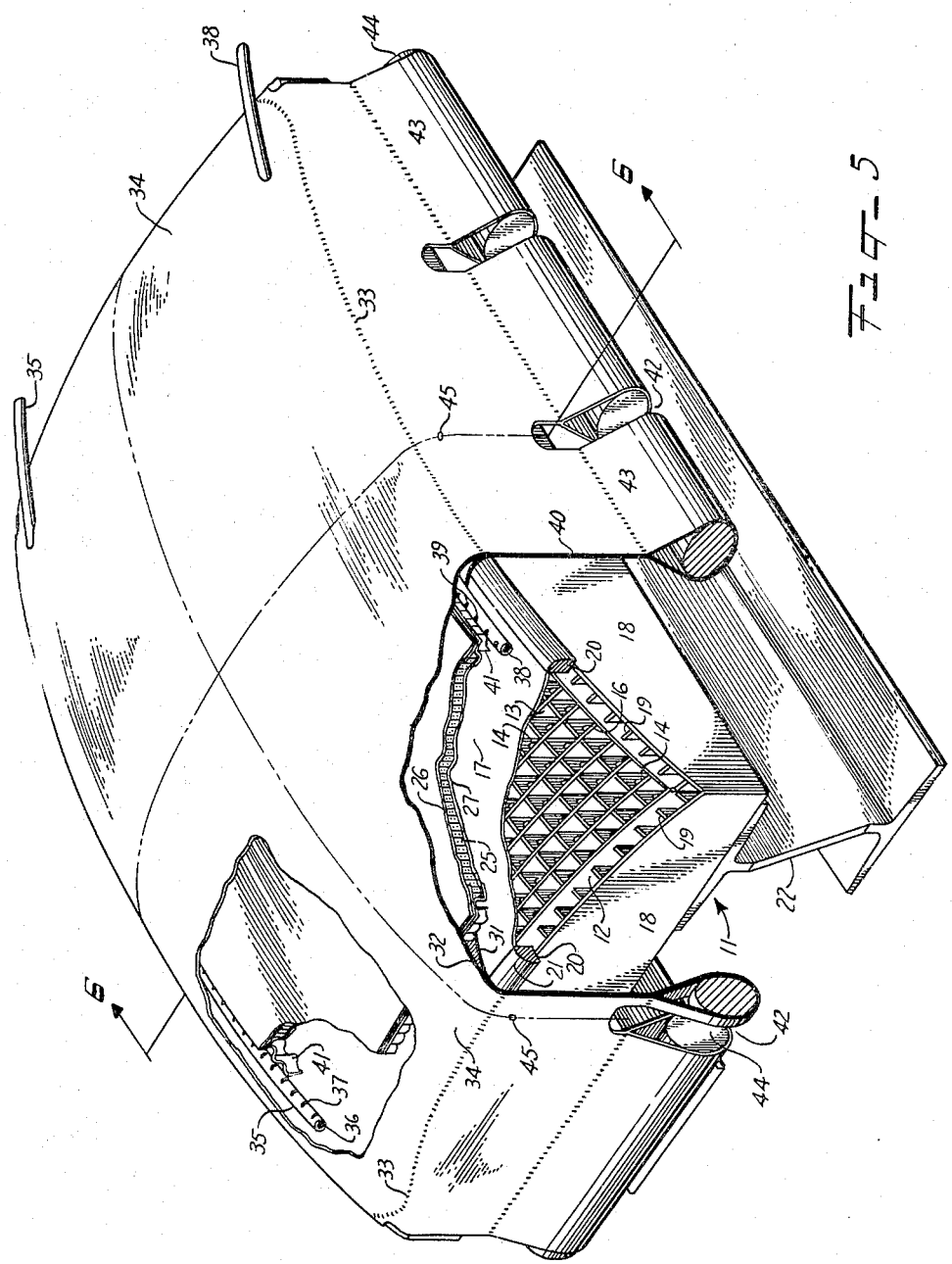
Fig. 5 is a perspective view of a supporting fixture on which a sandwich panel having curved surfaces is supported with sections of both panel and fixture cut away to show details of their construction.

After cleaning in any known manner, one face of each of two stainless steel sheets 26, 27 is covered with a thin layer of masking material which is insoluble in a plating solution 59 (Fig. 1) contained in a tank 60. The sheets are then lowered, together with a cellular honeycomb core 25 made of stainless steel, preferably of a thickness between .001 to .003 inch, into the solution. The parts are left in the solution until a coating 61 of a nickel-phosphorous alloy is chemically plated on the entire core and the exposed faces of the sheets. The plating is continued until a thickness of about .001 inch has been built up, when the parts are removed from tank 60 and dried. The plating is a nickel-phosphorous alloy containing from 7 to 11 percent phosphorous and the balance nickel, is non-porous and has a melting point of from 1635° to 1750° F. The plating has a high tensile strength and when the sheets and core are assembled together and heated in a manner later described, the plating alloy melts and forms rounded fillets 62 (Fig. 8) which unite the plating on each cell to that on the abutting sheets 26 and 27. After brazing, the coating of plating alloy serves as an agent which securely bonds the core to the skins 26—27 of the panel.

Plating bath 59 is preferably kept at a temperature of from 190° to 210° F. by a gas heater 63 disposed under tank 60. The bath is an aqueous solution of any of the following compositions:

*Solution 1*

Percent by weight

Nickel chloride, $NiCl_2 \cdot 6H_2O$ _____ 30
Sodium hypophosphite, $NaH_2PO_2 \cdot H_2O$ _____ 10
Sodium hydroxy-acetate, $NaC_2H_3O_3$ _____ 10 to 50
Water _____ Balance

*Solution 2*

(1) Nickel chloride or acetate
(2) Sodium, potassium, lithium, calcium, magnesium, strontium or barium hypophosphite
(3) Sodium or potassium acetate
(4) Water The bath is kept at about 210° F. and the pH of the solution is initially adjusted within the range of 5.35 to 5.50 by the addition of hydrochloric acid, HCl. As the plating proceeds, small amounts of the acetate are added, this agent acting as a buffer to compensate for the increasing acidity of the bath resulting from the reduction of the nickel ions. The ratio between the nickel ions and the hypophosphite ions in the solution is preferably kept within the range of .25 to .60. If a hypophosphite ion concentration of .225 mole/liter is used, and the acetate ions of the buffer are preferably of a concentration of .120 mole/liter. The effects of the several components of the plating solution are fully discussed in U.S. Patent No. 2,658,841 of November 10, 1953.

Figure 6:
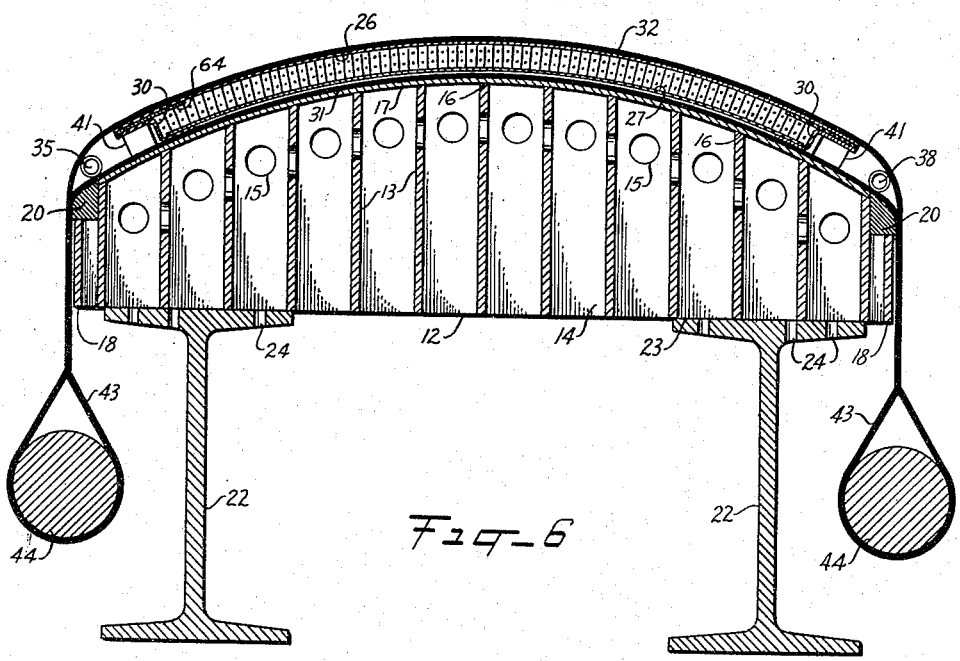
Fig. 6 is a cross sectional view of Fig. 5 taken on line 6—6.

Referring to Figs. 4 to 6, core 25 is placed between sheets 26, 27 with the plated faces of the sheets in contact with the core to provide sandwich panel 10. The panel is placed in a fixture 11 consisting of a rigid metal lattice 12 composed of flat metal bars 13 intersecting each other at substantially right angles to form a series of cells 14. The walls of each of the cells are provided with openings 15 passing therethrough which permit air to circulate freely throughout the lattice. The upper surface 16 of the lattice is machined to the contour of the panel to be formed and is covered by a metal sheet 17 formed to the contour of surface 16 to provide a smooth continuous supporting surface for the sandwich panel. A rigid frame 18 completely surrounds lattice 12 and is connected thereto by connecting ribs 19. A metal molding 20 having a smooth rounded face 21 blending with sheet 17 and extending out beyond frame 18 surrounds lattice 12 and is supported by frame 18. Lattice 12 is supported on I beams 22 the upper surfaces 23 of which are provided with openings 24 communicating with cells 14. A closure member 30, which has previously been plated in plating solution 59 in the manner above described, is placed around the edges of core 25 in contact therewith. Preferably the top face of core 25 around its edge is undercut slightly and a thin sheet metal doubler 64 is inserted between the top face of member 30 and skin 26. Doubler 64 has previously been plated with nickel alloy in solution 59 in the manner above described. Member 30 may be one of various shapes in cross section such as a C shape or Z shape as shown in the drawing and is for the purpose of providing the panel with an edge adapted to receive the fasteners (not shown) used in securing the panel to a structure of any type. Panel 10 in assembled relationship is positioned between two sheets 31 and 32 of flexible sheet metal both of which are of substantially greater size than skins 26, 27. Sheets 31 and 32 are secured together as by resistance seam welding along a line extending entirely around panel 10 as shown at 33 (Fig. 5), thus forming a sealed envelope 34 containing panel 10. Envelope 34 is provided with an outlet tube 35 passing through sheet 31 and extending along one side of panel 10 within the envelope. The inner end 36 of tube 35 is closed and the portion of the tube within envelope 34 is provided with spaced apart slots 37 passing through the wall thereof. Envelope 34 is also provided with an inlet tube 38 which passes through sheet 31 and extends along the opposite side of panel 10 within the envelope. The portion of tube 38 within envelope 34 is provided with spaced apart openings 39 which are of such size that their combined area is approximately equal to the cross sectional area of tube 38 and the inner end (not shown) of tube 38 is closed. The extending edges 40 of sheets 31 and 32 are secured together and portions cut away as shown at 42 to provide slings 43 adapted to receive weights 44. To hold the various parts of panel 10 in assembled relationship with each other while the panel is being enclosed in envelope 34, the panel parts are previously tack welded together in their proper positions.

Envelope 34 containing panel 10 is placed on fixture 11, as shown in Figs. 5 and 6, with the center of the panel in approximate alignment with the center of lattice 12. To facilitate this procedure, sheets 31 and 32 are provided with small openings 45 passing therethrough outwardly of seam 33 which are aligned with suitable markings (not shown) on fixture 11. Weights 44 are placed in slings 43 and permitted to hang down and apply tension to the edges of envelope 34 thus causing sheet 31 to conform to the contour of the top of lattice 12 and sheet 32 to force sheets 26 and 27 against core 25. To prevent damage to the edges of panel 10 from the force with which they are pressed against fixture 11, a rigid supporting member 41 shaped as an undulate strip of metal is placed under the top projecting portion of closure member 30, as shown in Figs. 5 and 6, to support the edges of the panel.

In the above description of fixture 11 the upper surface 16 of lattice 12 is machined to a contour adapted to support panel 10 which is illustrated as having two curved skins 26 and 27 resting against a cellular core 25 of uniform thickness. It is to be understood that fixture 11 may be used to equal advantage in supporting a panel comprising one flat skin and one curved skin between which is placed a honeycomb core having a flat lower face and an opposite face curved to conform to the shape of the curved skin. In this instance upper surface 16 of lattice 12 is machined to a plane face to provide a plane supporting surface for flat sheet 17 and envelope 34.

Figure 7:
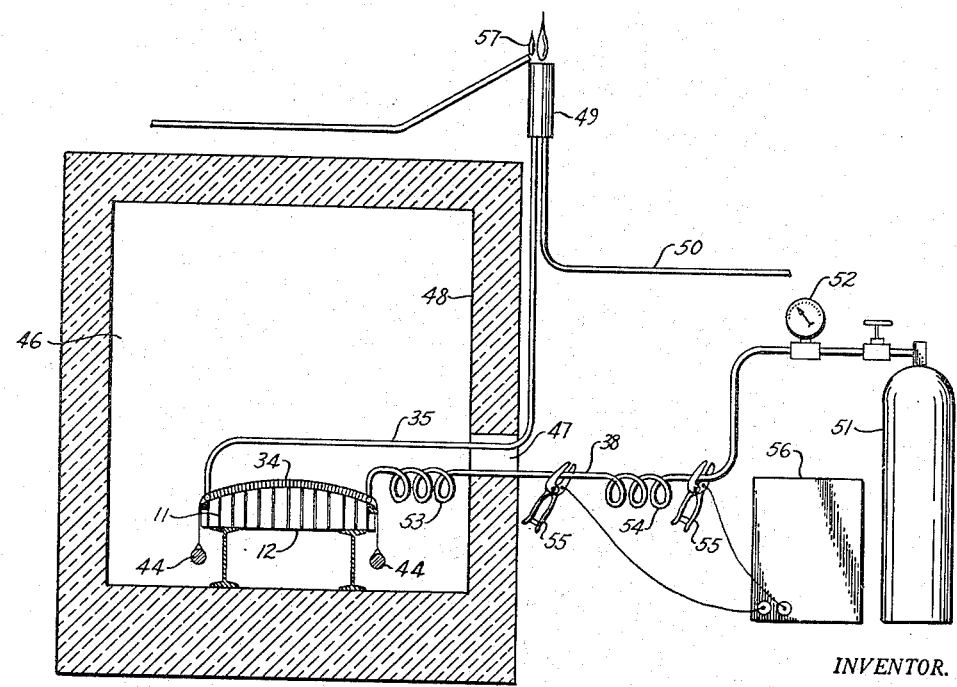
Fig. 7 is a schematic drawing of the entire apparatus used while brazing the parts of a sandwich panel together.

Referring to Fig. 7, fixture 11 supporting envelope 34 and panel 10 is placed in a furnace 46 with tubes 35 and 38 extending out through an opening 47 in the wall 48 thereof. Outlet tube 35 is attached to an aspirator 49 of known type operated by compressed air supplied by a source (not shown) through an air line 50, for the purpose of withdrawing air from within sealed envelope 34. Inlet tube 38 is connected to a source 51 of dry hydrogen or other inert gas and is provided with a regulator 52 to control the amount of gas entering envelope 34 therethrough. A section of tube 38 within the furnace 46 is formed in a spiral coil 53 and a section outside of the furnace is formed in a spiral coil 54 to provide means for heating the hydrogen gas at it passes through coil 54. Coil 54 is heated by its resistance to an electrical current passing therethrough between connections 55 attached to tube 38 at each end of coil 54 and which are connected with the secondary winding of an electrical transformer 56. The electrical current flowing through coil 54 may be controlled by adjustment of transformer 56 in any known manner to bring the temperature of the gas leaving coil 54 up to a desired value. Coil 54 within furnace 46 is heated by the furnace atmosphere so that the temperature of the gas is further increased while passing through coil 53 before entering envelope 34.

To perform the brazing operation, air is withdrawn from within envelope 34 through outlet tube 35 by means of aspirator 49 to lower the pressure within envelope 34 a substantial amount below the pressure of the ambient furnace atmosphere. The decreased pressure within envelope 34 causes the pressure of the ambient atmosphere to press sheets 31 and 32 inwardly against skins 26 and 27 forcing the plating alloy 61 on the skins into contact with the plating alloy on the ends of the cells of core 25. Hydrogen gas from source 51 is permitted to flow through tube 38 into envelope 34, the rate of flow being controlled by regulator 52 so that pressure within envelope 34 remains below the pressure of the surrounding furnace atmosphere. The air withdrawn from within envelope 34 enters tube 35 through slots 37 along one side of panel 10 and the hydrogen gas admitted into envelope 34 leaves tube 38 through openings 39 on the opposite side of the panel so that withdrawal of air from envelope 34 and core 25 and its replacement with hydrogen gas takes place quickly. To prevent the pressure within envelope 34 from rising during the brazing operation, aspirator 49 remains in operation to continually withdraw a small amount of hydrogen from within envelope 34, the gas being ignited by a pilot flame 57 as it leaves aspirator 49 to render it harmless. To facilitate withdrawal of air from panel 10 and to permit the hydrogen gas to flow quickly into all parts of core 25, the cell walls are provided with small holes 58 (Fig. 4) which form passages connecting individual cells.

Furnace 46 is gradually heated by any known type of heating means (not shown) to a temperature within the range of 1700° to 1850° F. and electrical current is passed through coil 54 to heat the hydrogen gas passing therethrough. The hot furnace atmosphere circulates freely through lattice 12 passing through openings 15 (Fig. 6) in the walls of cells 14 to uniformly heat panel 10. Also due to the preheating of the hydrogen gas by coils 53 and 54 before it enters panel 10, the entire panel soon reaches the brazing temperature which causes the nickel alloy on the skins 26—27 to melt and unite with that on the ends of the cells of core 25 and shape itself into fillets 62 which upon cooling and hardening firmly secure the skins to the core. The plating alloy on closure member 30 and that on doubler 64 also fuses and unites with that on core 25 and skins 26—27. When the brazing is completed, transformer 56 is disconnected and the flow of hydrogen through tube 38 stopped. Tubes 35 and 38 are disconnected from aspirator 49 and hydrogen tank 51 respectively, whereupon fixture 11 is removed from the furnace. Envelope 34 and panel 10 are allowed to slowly cool to room temperature when the brazed panel is removed from the envelope. The brazing operation having taken place in an atmosphere free of oxygen, all the component parts of the sandwich panel are entirely free from scale or other undesirable effects which would result if air or oxygen were present in envelope 34 during the brazing operation.

It has been found that the thin layers of plating alloy on the core and skins 31—32 bridge any small gaps which may exist between the members due to surface irregularities. After the panel is completed, it may be reheated to a temperature of approximately 2,000° F. without coming apart at the brazed seams.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. The method of brazing a stainless steel sheet to one face of a stainless steel core composed of a plurality of interconnected honeycomb cells the thickness of whose walls is within the range of .001 to .003 inch which comprises the steps of immersing the sheet and core in a hot plating bath consisting essentially of an aqueous solution of a nickel salt and a hypophosphite until a nickel phosphorous alloy film about .001 inch thick covers entirely the entire core and at least one face of the sheet, said plating bath having the composition by weight,

| | Percent |
|---|---|
| Nickel chloride | 30 |
| Sodium hypophosphite | 10 |
| Sodium hydroxy-acetate | 10 to 50 |
| Water | Balance | removing the plated sheet and core from said plating bath; drying the plated sheet and core; pressing said plated sheet against said core to hold the nickel phosphorous alloy film on said sheet in firm contact with the nickel phosphorous alloy film attached to said face of the core and simultaneously heating said sheet and core to the fusion temperature of said nickel alloy film within the range of 1700° to 1850° F.

2. The method of brazing stainless steel sheet and core as in claim 1 and comprising the additional step of surrounding said sheet and core with a reducing atmosphere during said heating of the same to said fusion temperature.

References Cited in the file of this patent

UNITED STATES PATENTS

| | | |
|---|---|---|
| 1,806,738 | Burns et al. | May 26, 1931 |
| 2,232,176 | Guthrie | Feb. 18, 1941 |
| 2,390,452 | Mudge | Dec. 4, 1945 |
| 2,398,449 | Ronci | Apr. 16, 1946 |
| 2,481,046 | Scurlock | Sept. 6, 1949 |
| 2,633,631 | Horvitz | Apr. 7, 1953 |
| 2,720,949 | Pajak | Oct. 18, 1955 |
| 2,722,735 | Beamish | Nov. 8, 1955 |
| 2,778,458 | Briggs | Jan. 22, 1957 |
| 2,795,040 | Antel et al. | June 11, 1957 |
| 2,798,843 | Slomin et al. | July 9, 1957 |
| 2,900,713 | Young | Aug. 25, 1959 |

FOREIGN PATENTS

| | | |
|---|---|---|
| 487,263 | Great Britain | June 17, 1938 |